Aug. 1, 1939.  F. A. OSTENBERG  2,167,848
TRACTOR FRAME
Filed Jan. 21, 1939   2 Sheets-Sheet 2
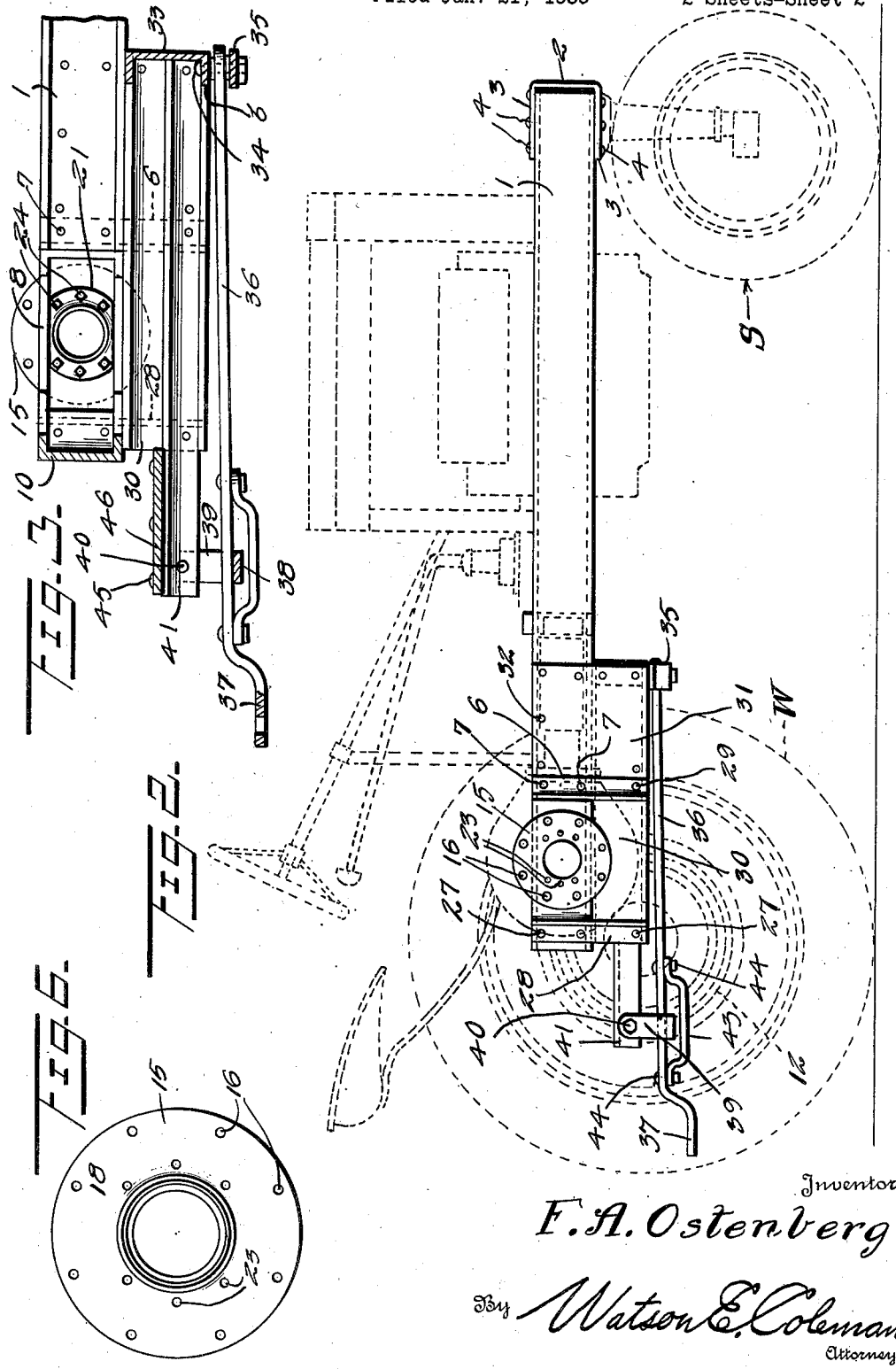
Inventor
F. A. Ostenberg
By Watson E. Coleman
Attorney Patented Aug. 1, 1939

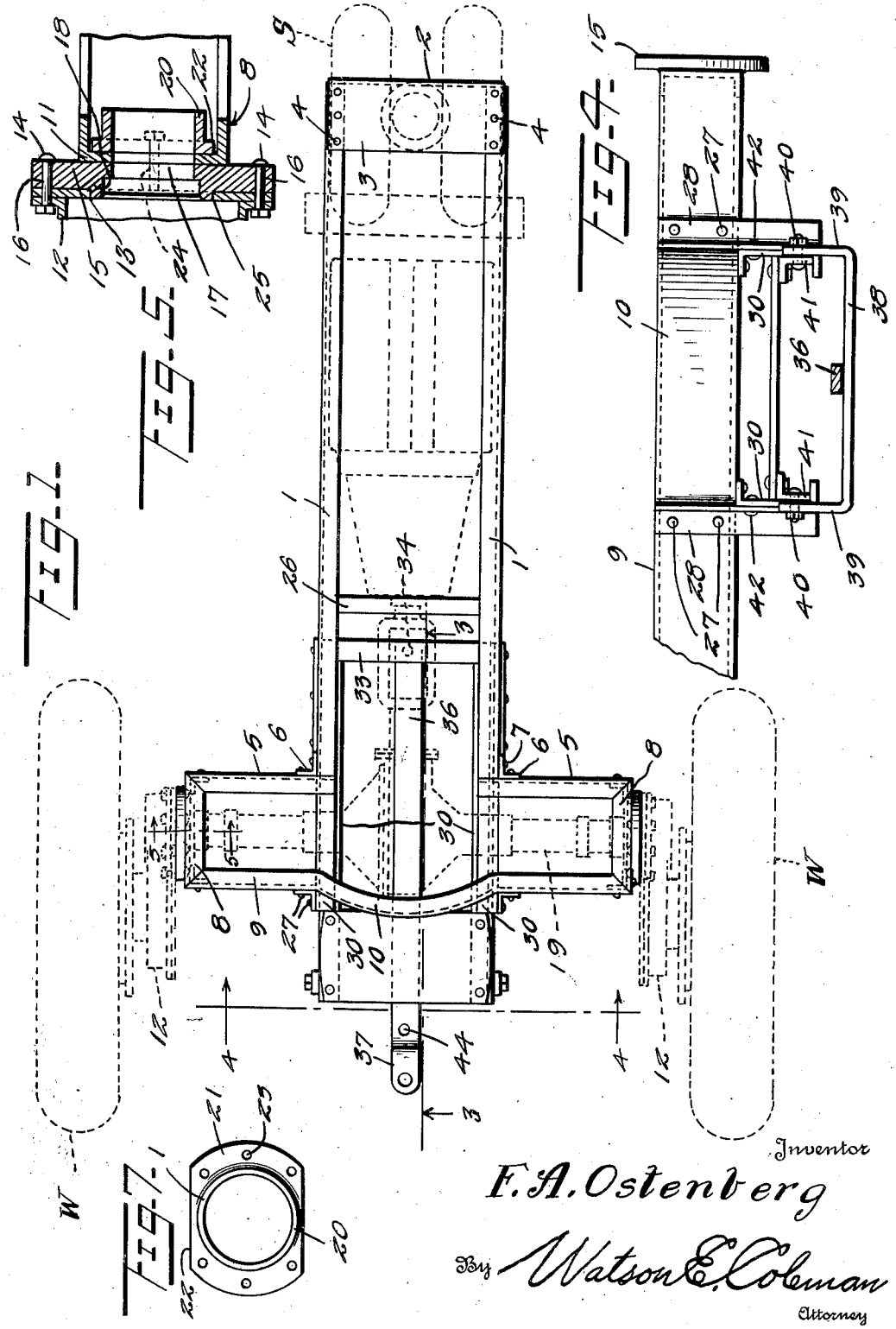

2,167,848

UNITED STATES PATENT OFFICE 2,167,848

TRACTOR FRAME

Frans A. Ostenberg, Salina, Kans.

Application January 21, 1939, Serial No. 252,186

4 Claims. (Cl. 280—106)

This invention relates to improvements in tractor frames, and it is an object of the invention to provide a frame of this kind in connection with which may be readily used any standard make of truck or passenger car units in the assembly of an all-purpose farm tractor.

It is also an object of the invention to provide a frame of this kind in the general form of a T, the head portion of which is constructed and assembled to permit effective mounting of a rear axle assembly.

Another object of the invention is to provide a frame of this kind comprising means whereby the drive wheels are in driven connection through independent chain drives with a power plant mounted within the frame and wherein the frame is provided with a sub-frame with which is associated a draw bar assembly.

The invention consists in the details of construction and in the combination and arrangement of the several parts of my improved tractor frame whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a tractor frame constructed in accordance with an embodiment of my invention, various parts of an assembled tractor associated therewith being indicated by broken lines;

Figure 2 is a view in side elevation of the frame as illustrated in Figure 1 with parts of the tractor assembly also indicated by broken lines;

Figure 3 is a fragmentary detailed sectional view taken substantially on the line 3—3 of Figure 1;

Figure 4 is a rear elevation of the frame as illustrated in Figure 1 with a part in section, said section being on the line 4—4 of Figure 1 looking in the direction of the arrow;

Figure 5 is an enlarged detailed sectional view taken substantially on the line 5—5 of Figure 1 and particularly illustrating the means for mounting a chain case and an adjacent end portion of an axle housing;

Figure 6 is a view in elevation of a casing flange as herein comprised unapplied;

Figure 7 is an elevational view of an axle housing flange unapplied.

As disclosed in the accompanying drawings, my improved tractor frame comprises two elongated side members 1 each preferably comprising a channel iron with the flanges thereof inwardly disposed. These members 1 are spaced as desired and arranged in parallelism. The forward end portions of the members 1 are connected by a channel member 2, the flanges 3 of which extend inwardly of the members 1 and receiving the forward end portions of said members 1 therebetween. These flanges 3, as herein disclosed, are riveted, as at 4, to the members 1 although it is believed to be obvious that other securing means may be employed, such as welding. The member 2, or more particularly the flange 3, is of such dimensions as to permit proper mounting of the conventional front steering wheels S indicated by broken lines. The construction, mounting and operation of these wheels S form no particular part of the present invention.

Butting the rear ends of the members 1 are the inner portions of the outwardly and laterally disposed channel members 5 of desired length and having their flanges inwardly directed. The inner extremities of these members 5, as herein disclosed, are held to the members 1 by the angle irons 6 which extend a desired distance below the members 1. These angle irons 6, as herein disclosed, are secured to the members 1 and 5 by the rivets 7 although other fastening means may be employed with equal advantage.

The members 5, as herein disclosed, are at right angles to members 1 and are of equal length. The outer ends of these members 5 are welded or otherwise rigidly secured to the rearwardly directed head end members 8. These members 8 extend rearwardly of the members 5 and at right angles thereto. The rear end portions of these members 8 are welded or otherwise rigidly connected to the opposite ends of the rear transverse head member 9. These members 8 and 9 are preferably channel irons with their flanges inwardly disposed.

The portion of the member 9 bridging the space between the members 1 is disposed, as at 10, on an outward curvature of a desired radius. It is believed to be apparent that the members 1, 2, 5, 8 and 9 provide an assembly resulting in a box frame of a T-formation with the head thereof rearwardly directed. Each of the members 8 in its central part is provided with an opening 11 through which is adapted to extend an end portion of a rear axle housing and which axle housing is also adapted to extend within the attaching flange 15 for association with a chain drive casing 12 for an adjacent rear drive wheel W generally indicated by broken lines. The casing 12 and chain drive are well known and in themselves form no part of the present invention. However, in the present instance the upper end portion of the casing 12 is bolted, as at 14, to an attaching flange 15, with inner side plate 25 being bolted between casing 12 and attaching flange 15, as at 14, said flange 15 in its peripheral portion being provided therearound with the circumferentially spaced openings 16 through which the bolts 14 are directed. This flange 15 is preferably of heavy formation and has its central portion provided with an opening 17 through which the rear axle housing is inserted for entry within the casing 12. The outer face of this flange 15 is provided with an outstanding annular bead 18 substantially defining the opening 17 and opening 13 of inner side plate 25.

Any type of rear axle assembly taken from any make of motor vehicle is positioned within the head portion of the frame and welded to each end of the housing 19 (indicated by broken lines) is the central sleeve 20 of the rear axle housing end flange 21. The upper and lower portions of this flange 21 are cut away along the straight lines 22 so that said flange may be readily received between the inwardly disposed flanges a of an end head member 8.

The flange 21, as particularly illustrated in Figure 5, is at the inner side of the head end member 8 and the flange 15 is at the outer side of said member 8. The flange 21 is provided with the openings 23 in the central portion of the flange 21 through which the holding stud bolts 24 are directed, said stud bolts of course being also inserted through the member 8 and screwed into threaded openings 23 of flange 15. It is believed to be obvious that through the medium of the flanges 15 and 21 rigid mountings are provided for the rear axle housing with sufficient supporting strength in transmitting the traction power to the wheels W.

At a suitable point therealong the members I have interposed therebetween the cross member 26 for conventional coaction with the applied power plant.

The head cross member 9 adjacent to the opposite ends of the curved portion 10 has riveted, as at 27, or otherwise rigidly secured thereto the upper end portions of the depending inner members 28 positioned directly in advance of the angle members 6 hereinbefore referred to. Riveted or otherwise secured, as at 29, against the inner faces of the depending portions of the members 6 and 27 are the side members 30 of a rear sub-frame. These members 30 preferably comprise channel irons with the flanges thereof inwardly disposed. These members 30 terminate a desired distance forwardly of the rear head structure and overlying the adjacent forward portions of the members I and 30 are the reinforcing plates 31 herein disclosed as held in place by the rivets 32 although, of course, other means may be employed to maintain a rigid mounting for said plates 31.

The inner ends of the members I are connected by a cross member 33 preferably welded to the forward end portions of the members 30. This member also comprises a channel iron with its flanges inwardly or rearwardly directed. The lower flange b of this member 33 at a point midway between the members I has inserted therethrough from above a king pin or bolt 34. The lower portion of this pin or bolt extends through a brace loop strap 35 of a conventional type, the extremities of which are suitably secured to the under surface of the lower flange b of the member 33. This king pin or bolt 34 is operatively disposed in a conventional manner thru the forward end portion of a draw bar 36. This bar 36 is of a length to terminate a desired distance rearwardly of the frame and said rear or free end portion of the bar 36 is formed to provide a hitch 37.

The rear or free end portion of this bar 36 freely engages from above the intermediate or base member 38 of a substantially U-shaped supporting member. The upstanding side arms 39 of this member are bolted, as at 40, or otherwise securely fastened to the outer extended extremities of the angle members 41. These members 41 extend along the lower portions of the members 30 and are riveted or otherwise securely attached thereto, as indicated at 42. The bar 36 adjacent to the hitch 37 carries a depending loop bracket 43 which underlies the intermediate or base member 38 and the extremities of this bracket 43 are bolted, as at 44, or otherwise securely held to the bar 36.

The extended portions of the members 41 have riveted or otherwise secured thereto, as at 45, a stepped plate 46.

The power plant transmission and other units necessary in the tractor assembly are mounted within the frame as may be preferred.

From the foregoing description it is thought to be obvious that a tractor frame constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A tractor frame comprising side members, outwardly and laterally directed members carried by the rear extremities of the side members, rearwardly disposed end members carried by the outer extremities of the lateral members, and a cross member secured to the rear extremities of the end members, the assembly of said members providing a T-shaped frame, and means coacting with the end members for supporting a rear axle driving assembly.

2. A frame for a tractor substantially T-shaped in plan including end members for the head having openings therethrough, casing attaching flanges at the outer faces of the end members, housing supporting flanges at the inner faces of the members, and means for securing the flanges to the members, said flanges having openings for registry with the openings in the members.

3. A frame for a tractor substantially T-shaped in plan including end members for the head having openings therethrough, casing attaching flanges at the outer faces of the end members, housing supporting flanges at the inner faces of the members, and means for securing the flanges to the members, said flanges having openings for registry with the openings in the members.

4. A box frame for a tractor substantially T-shaped in plan with the head portion rearwardly disposed, members depending from the frame at the rear thereof and extending across the head, a cross member connecting the inner portions of said members, a draw bar pivotally engaged with said cross member, said bar being of a length to extend beyond the rear end of the frame, elongated members secured to the first named members and terminating rearwardly therebeyond, a substantially U-shaped member depending from the extended extremities of said elongated members, the draw bar overlying the intermediate portion of said U-shaped member, and a loop bracket depending from the draw bar and underlying the intermediate member of the U-shaped member.

FRANS A. OSTENBERG.